United States Patent
Chang et al.

(10) Patent No.: US 9,437,047 B2
(45) Date of Patent: Sep. 6, 2016

(54) METHOD, ELECTRONIC APPARATUS, AND COMPUTER-READABLE MEDIUM FOR RETRIEVING MAP

(71) Applicant: HTC Corporation, Taoyuan County (TW)

(72) Inventors: Yung-Lung Chang, Taoyuan County (TW); Ruey-Jer Chang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 51 days.

(21) Appl. No.: 14/155,366

(22) Filed: Jan. 15, 2014

(65) Prior Publication Data
US 2015/0199852 A1    Jul. 16, 2015

(51) Int. Cl.
| | | |
|---|---|---|
| *G06T 19/20* | (2011.01) | |
| *G06K 9/00* | (2006.01) | |
| *G09G 5/377* | (2006.01) | |
| *G06T 17/05* | (2011.01) | |
| *G06F 3/147* | (2006.01) | |

(52) U.S. Cl.
CPC ........... *G06T 19/20* (2013.01); *G06K 9/00637* (2013.01); *G06K 9/00651* (2013.01); *G06K 9/00671* (2013.01); *G06T 17/05* (2013.01); *G09G 5/377* (2013.01); *G06F 3/147* (2013.01); *G06T 2207/30181* (2013.01); *G06T 2219/2004* (2013.01)

(58) Field of Classification Search
CPC .................................................. G06T 19/006
See application file for complete search history.

(56) References Cited

U.S. PATENT DOCUMENTS

| | | | |
|---|---|---|---|
| 2008/0186255 A1* | 8/2008 | Cohen et al. ...................... 345/8 |
| 2010/0199232 A1* | 8/2010 | Mistry .................... G06F 1/163 |
| | | | 715/863 |
| 2011/0013014 A1* | 1/2011 | Wassingbo .................. 348/113 |
| 2014/0267406 A1* | 9/2014 | Mullins ................. G06T 19/006 |
| | | | 345/633 |
| 2014/0314282 A1* | 10/2014 | Cheng et al. ................. 382/113 |

FOREIGN PATENT DOCUMENTS

| | | |
|---|---|---|
| CN | 101138015 | 3/2008 |
| TW | 200949206 | 12/2009 |
| TW | 201037280 | 10/2010 |

(Continued)

OTHER PUBLICATIONS

Jonathon S. Hare, Paul H. Lewis, Layla Gordon, and Glen Hart, MapSnapper: Engineering an Efficient Algorithm for Matching Images of Maps from Mobile Phones, Jan. 2008, SPIE, Proceedings SPIE 6820, In Electronic Imaging 2008, Multimedia Content Access: Algorithms and Systems II, vol. 6820L, pp. 68200L-1-68200L-10.*

(Continued)

*Primary Examiner* — Jeffrey A Brier
(74) *Attorney, Agent, or Firm* — Jianq Chyun IP Office (57) ABSTRACT

The invention discloses a method, an electronic apparatus, and a computer readable medium for retrieving a map. The method includes the following steps. Firstly, a picture of a printed map is obtained. A block area surrounded by a road outline in the picture is defined. A map service is queried to find an electronic map having a map area corresponding to the block area according to contents of the printed map. A plurality of 3-D models of a plurality of buildings located in the map area is retrieved. The 3-D models are mapped on the picture.

17 Claims, 10 Drawing Sheets

(56) References Cited

FOREIGN PATENT DOCUMENTS

| TW | 201100753 | 1/2011 |
|---|---|---|
| TW | 201115502 | 5/2011 |
| TW | 201142742 | 12/2011 |
| TW | 201214347 | 4/2012 |
| TW | 201329484 | 7/2013 |
| WO | 2012053029 | 4/2012 |
| WO | 2012095919 | 7/2012 |

OTHER PUBLICATIONS

Ann Morrison, Antti Oulasvirta, Peter Peltonen, Saija Lemmela, Giulio Jacucci, Gerhard Reitmayr, Jaana Näsänen, and Antti Juustila, Like Bees Around the Hive: A Comparative Study of a Mobile Augmented Reality Map, Apr. 2009, ACM, In Proceedings of the SIGCHI Conference on Human Factors in Computing Systems, pp. 1889-1898.*

Chunyuan Liao, Qiong Liu, Bee Liew, and Lynn Wilcox, Pacer: Fine-grained Interactive Paper via Camera-touch Hybrid Gestures on a Cell Phone, Apr. 2010, ACM, In CHI '10 Proceedings of the SIGCHI Conference on Human Factors in Computing Systems, pp. 2441-2450.*

Matei Stroila, Joe Mays, Bill Gale, and Jeff Bach, Augmented Transit Maps, Jan. 2011, IEEE, 2011 IEEE Workshop on Applications of Computer Vision (WACV), pp. 485-490.*

Ann Morrison, Alessandro Mulloni, Saija Lemmelä, Antti Oulasvirta, Giulio Jacucci, Peter Peltonen, Dieter Schmalstieg, and Holger Regenbrecht, Collaborative use of mobile augmented reality with paper maps, article available online May 8, 2011, Aug. 2011, Computers & Graphics, vol. 35, Issue 4, pp. 789-799.*

Chueh-Min Cheng et al., "Method, Electronic Apparatus, and Computer-Readable Medium for Recognizing Printed Map", published U.S. Appl. No. 13/865,988, filed Apr. 18, 2013.

"Office Action of Taiwan Counterpart Application", issued on Oct. 2, 2015, p. 1-p. 20.

* cited by examiner

FIG. 6B

METHOD, ELECTRONIC APPARATUS, AND COMPUTER-READABLE MEDIUM FOR RETRIEVING MAP

BACKGROUND

1. Field of the Invention

The application relates to a method for retrieving a map, in particular, to a method and an electronic apparatus that perform functions of augmented reality while retrieving a map.

2. Description of Related Art

In modern societies, people get more and more chances to travel. In the journey of travels, the map plays an important role when visiting a scenic area since it provides a variety of useful information to tourists. The printed maps can usually be seen on travel books, brochures, or guideboards in the scenic area. However, those printed maps are only made of 2D graph, from which users are difficult to know the place's look or topography. As a result, when reading the information in the printed map, the user may be confused, and even get lost.

SUMMARY

Accordingly, the present invention is directed to a method, an electronic apparatus, and a computer readable medium for retrieving a map, which may provide users with a novel and fabulous way to retrieve a map.

The application provides a method for retrieving a map. The method is adapted to an electronic apparatus. The method includes the following steps. Firstly, a picture of a printed map is obtained. A block area surrounded by a road outline in the picture is defined. A map service is queried to find an electronic map having a map area corresponding to the block area according to contents of the printed map. A plurality of 3-D models of a plurality of buildings located in the map area is retrieved. The 3-D models are mapped on the picture.

In an example of the present application, the step of defining the block area surrounded by the road outline in the picture includes: performing an image processing method on the picture to detect the road outline; adopting a picture area surrounded by the road outline as the block area.

In an example of the present application, the step of querying the map service to find the electronic map having the map area corresponding to the block area according to the contents of the printed map includes: recognizing at least one road name related to the road outline; querying the map service with the at least one recognized road name to find the electronic map having the map area surrounded by at least one road corresponding to the at least one recognized road name in the map service.

In an example of the present application, the step of recognizing the at least one road name related to the road outline includes: performing a character recognition on at least one character around the road outline to obtain the at least one road name.

In an example of the present application, the step of querying the map service to find the electronic map having the map area corresponding to the block area according to the contents of the printed map includes: recognizing at least one road name related to the road outline; querying the map service with pairs of the at least one recognized road name to find a plurality of intersections in the map service; and adopting the map area having the intersections as corners in the map service as the map area corresponding to the block area.

In an example of the present application, the step of mapping the 3-D models on the picture includes: adjusting a scale and an orientation of the map area to fit the scale and the orientation of the block area of the printed map; pasting the 3-D models on the picture with the map area aligning to the block area.

In an example of the present application, before the step of pasting the 3-D models on the picture with the map area aligning to the block area, the method further includes: recognizing a plurality of street names within the road outline; dividing the block area into a plurality of sub blocks separated by a plurality of streets corresponding to the street names; finding a plurality of sub areas within the map area, wherein the sub areas correspond to the sub blocks; mapping each of the sub areas to the corresponding sub block according to a scale of the corresponding sub block.

In an example of the present application, the step of pasting the 3-D models on the picture with the map area aligning to the block area includes: pasting the 3-D model of each of the sub areas onto the corresponding sub block.

In an example of the present application, before the step of pasting the 3-D models on the picture with the map area aligning to the block area, the method further includes: recognizing a plurality of first shapes of a plurality of sub blocks in the block area, wherein the sub blocks are separated by a plurality of streets; finding a plurality of sub areas within the map area according to the first shapes of the sub blocks; mapping each of the sub areas to the corresponding sub block according to a scale of the corresponding sub block.

In an example of the present application, the step of pasting the 3-D models on the picture with the map area aligning to the block area includes: pasting the 3-D model of each of the sub areas onto the corresponding sub block.

The application provides a computer-readable medium, which records a computer program to be loaded into an electronic apparatus to execute the aforementioned method for retrieving a map. The computer program is composed of a plurality of program instructions (for example, an organization chart establishing program instruction, a table approving program instruction, a setting program instruction, and a deployment program instruction, etc), and these program instructions are loaded into the electronic apparatus and executed by the same to accomplish various steps of the method for retrieving a map.

The application provides an electronic apparatus for retrieving a map. The electronic apparatus includes an input unit, an output unit, a memory and a processing unit. The input unit is used to receive data. The output unit is used to present the data. The memory is used to store information comprising program routines. The processing unit is coupled to the input unit, the output unit and the memory for controlling the execution of the program routines. The program routines comprise an obtaining module, a defining module, a querying module, a retrieving module and a mapping module. The obtaining module obtains a picture of a printed map. The defining module defines a block area surrounded by a road outline in the picture. The querying module queries a map service to find an electronic map having a map area corresponding to the block area according to contents of the printed map. The retrieving module retrieves a plurality of 3-D models of a plurality of buildings located in the map area. The mapping module maps the 3-D models on the picture.

In an example of the present application, the defining module performs an image processing method on the picture to detect the road outline, and adopts a picture area surrounded by the road outline as the block area.

In an example of the present application, the querying module recognizes at least one road name related to the road outline, queries the map service with the at least one recognized road name to find the electronic map having the map area surrounded by at least one road corresponding to the at least one recognized road name in the map service.

In an example of the present application, the querying module performs a character recognition on at least one character around the road outline to obtain the at least one road name.

In an example of the present application, the querying module recognizes at least one road name related to the road outline, queries the map service with pairs of the at least one recognized road name to find a plurality of intersections in the map service, and adopts the map area having the intersections as corners in the map service as the map area corresponding to the block area.

In an example of the present application, the mapping module adjusts a scale and an orientation of the map area to fit the scale and the orientation of the block area of the printed map, and pastes the 3-D models on the picture with the map area aligning to the block area.

In an example of the present application, the mapping module further: recognizes a plurality of street names within the road outline; divides the block area into a plurality of sub blocks separated by a plurality of streets corresponding to the street names; finds a plurality of sub areas within the map area, wherein the sub areas correspond to the sub blocks; maps each of the sub areas to the corresponding sub block according to a scale of the corresponding sub block.

In an example of the present application, the mapping module pastes the 3-D model of each of the sub areas onto the corresponding sub block.

In an example of the present application, the mapping module further: recognizes a plurality of shapes of a plurality of sub blocks in the block area, wherein the sub blocks are separated by a plurality of streets; finds a plurality of sub areas within the map area according to the first shapes of the sub blocks; maps each of the sub areas to the corresponding sub block according to a scale of the corresponding sub block.

In an example of the present application, the mapping module pastes the 3-D model of each of the sub areas onto the corresponding sub block.

Based on the above description, the embodiments of the present invention provide a method, an electronic apparatus, and a computer readable medium for retrieving a map. With the proposed method, when a user uses an electronic apparatus to take a picture of a printed map, the electronic apparatus may directly paste the 3-D models of the buildings located in the printed map, such that a novel, intuitive, convenient, user experience can be established.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

Figure 1:
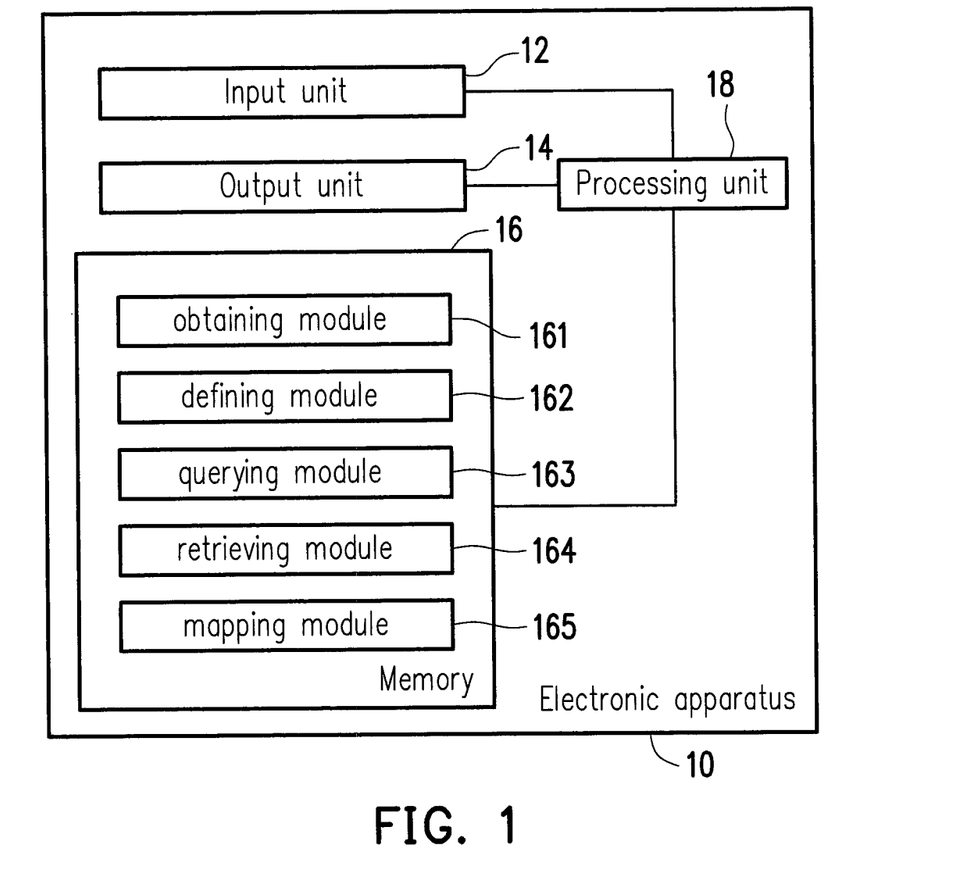
FIG. 1 is a schematic diagram of an electronic apparatus according to an example of the present application.

FIG. 1 is a schematic diagram of an electronic apparatus according to an example of the present application. In the present example, the electronic apparatus 10 includes an input unit 12, an output unit 14, a memory 16, and a processing unit 18. The electronic apparatus 10 is, for example, a portable electronic device, such as a smartphone, a personal digital assistant (PDA), a tablet or the like, and the application is not limited thereto. The input unit 12 is, for example, a touch pad, and is used to receive data. The output unit 14 is, for example, a display, and is used to present the data. The input unit 12 may be a touch panel, the output unit 14 may be a screen, and the input unit 12 and the output unit 14 may be integrated as a touch screen, but the application is not limited thereto.

The memory 16 is used to store information such as program routines. The memory 16 is, for example, one or a combination of a stationary or mobile random access memory (RAM), read-only memory (ROM), flash memory, hard disk, or any other similar device, and which records a plurality of modules that can be executed by the processing unit 18. These modules can be loaded into the processing unit 18 to perform a method for retrieving a map. The processing unit 18 is coupled to the input unit 12, the output unit 14, and the memory 16 for controlling the execution of the program routines. The program routines include an obtaining module 161, a defining module 162, a querying module 163, a retrieving module 164 and a mapping module 165.

The processing unit 18 includes one or a combination of a central processing unit (CPU), a programmable general- or specific-purpose microprocessor, a digital signal processor (DSP), a programmable controller, application specific integrated circuits (ASIC), a programmable logic device (PLD), or any other similar device.

Figure 2:
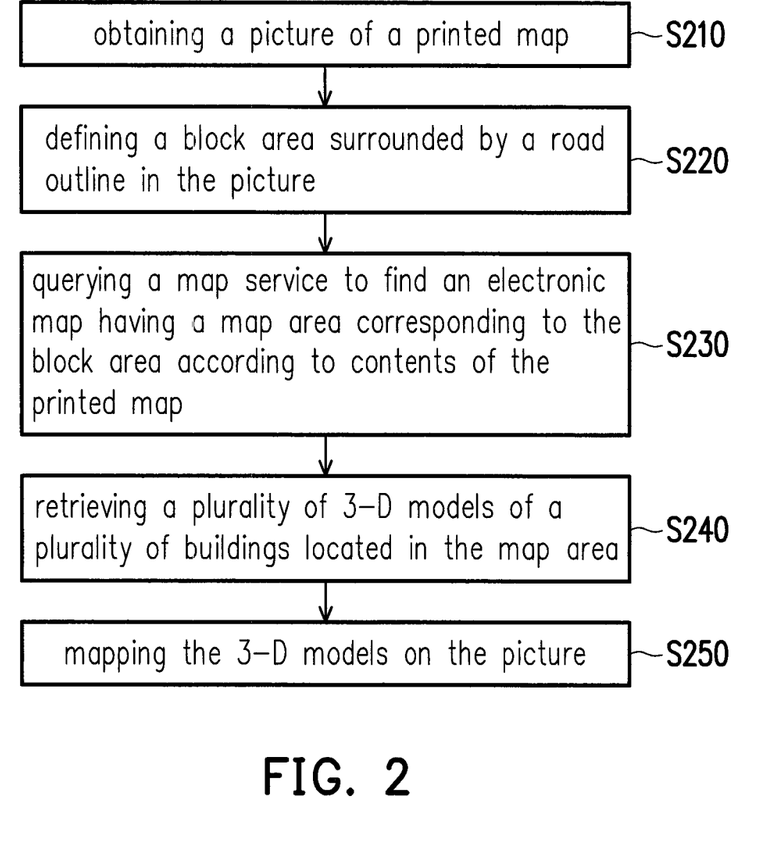
FIG. 2 is a flow chart illustrating a method for retrieving a map according to an exemplary example of the present application.
Figure 3A:
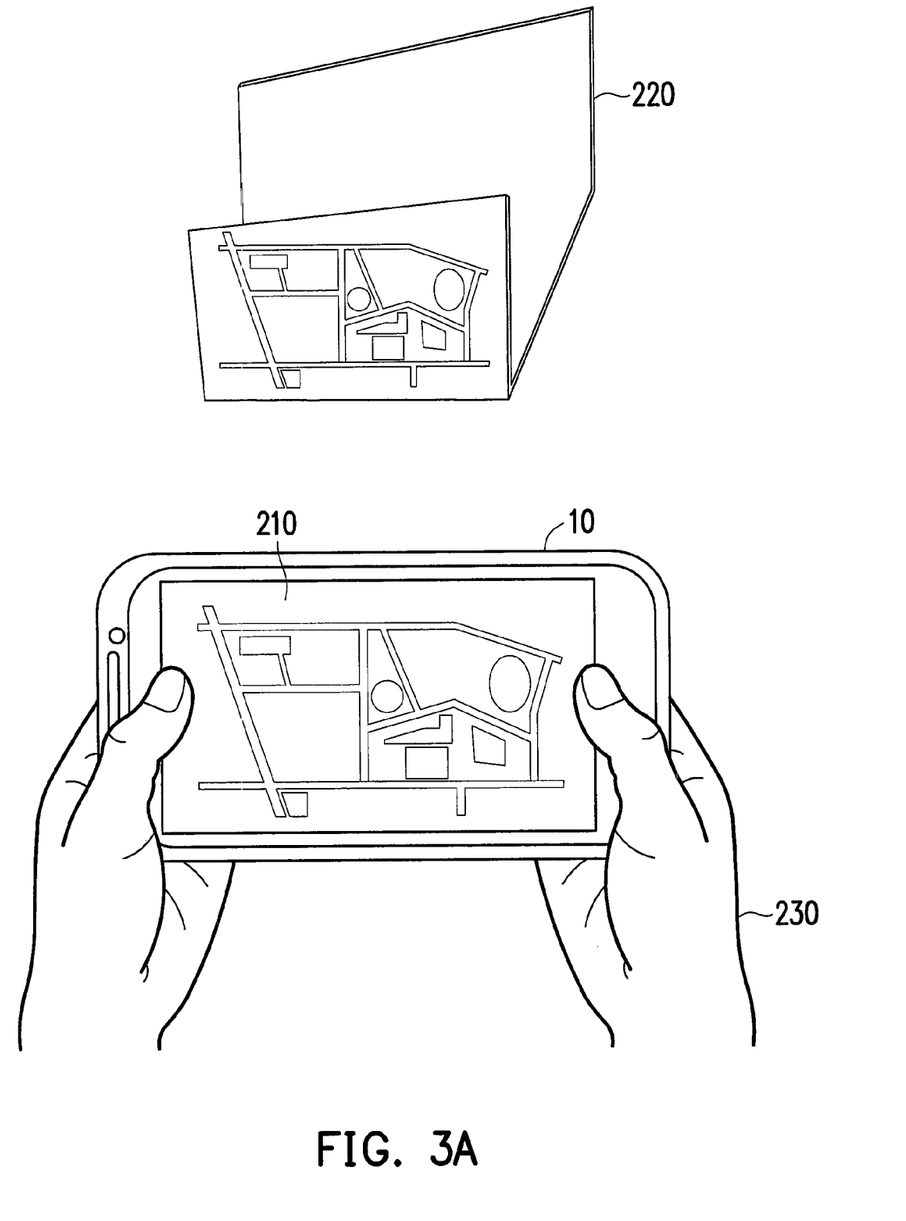
FIG. 3A is a schematic diagram illustrating a method for obtaining a picture of a printed map by using an electronic apparatus according to an example of the present application.

FIG. 2 is a flow chart illustrating a method for retrieving a map according to an exemplary example of the present application. In the present example, the steps illustrated in FIG. 2 may be adapted to the electronic apparatus 10 of FIG. 1, but the application is not limited thereto. FIG. 3A is a schematic diagram illustrating a method for obtaining a picture of a printed map by using an electronic apparatus according to an example of the present application. Below, the method for retrieving the map is described in detail with reference to various components of the electronic apparatus 10.

Referring to FIG. 1, FIG. 2, and FIG. 3A, in step S210, the obtaining module 161 obtains a picture 210 of a printed map 220 under the operation of a user 230. The printed map 220 may be a map printed on a tourist brochure or posted on an information board. For example, the obtaining module 161 may be configured for retrieving pictures of the printed map 220 from, for example, a photo taken by a camera, a photo gallery of the electronic apparatus 10, a cloud server, a web page or the like. To be specific, when the user 230 is travelling with the printed map 220, the user 230 may not be able to find the way to the destination since the printed map 220 may be a brief map in tourist brochures, or the printed map may be printed in a foreign language unfamiliar to the user 230. At this time, the user 230 may use an image capturing unit, for example a camera, (not shown) of the electronic apparatus 10 to capture the picture 210 of the printed map 220 and the obtaining module 161 may retrieve the picture 210 from the image capturing unit, so as to recognize the printed map 220 through an on-line map service. In another example, the picture 210 of the printed map 220 may be first saved in a photo gallery or saved in a local memory or a cloud memory. Afterward, the obtaining module 161 may retrieve the picture 210 from the photo gallery or the memory later, but the application is not limited thereto.

Figure 3B:
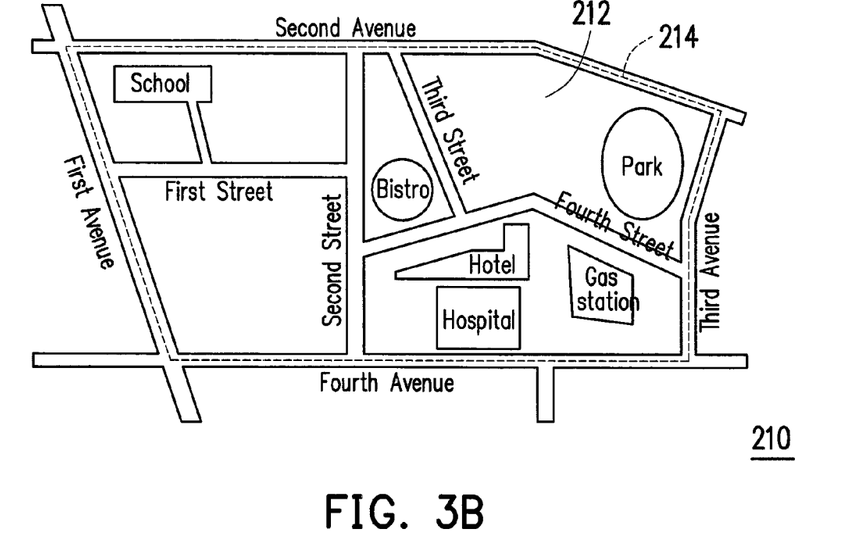
FIG. 3B is a schematic diagram illustrating the picture of the printed map according to an example of the present application.

FIG. 3B is a schematic diagram illustrating the picture of the printed map according to an example of the present application. Through interpreting the picture 210, the defining module 162 may define a block area 212 surrounded by a road outline 214 in the picture 210 in Step S220. In detail, the defining module 162 may perform image processing method on the picture 210 to detect the road outline 214. In some examples, the image processing method can be the edge detection or some other similar algorithms capable of detecting the road outline 214. In the present example, the road outline 214 may include the outermost roads in the picture 210, which is not limited thereto. It can be observed that, in the picture 210, the outermost roads include a First Avenue, a Second Avenue, a Third Avenue, and a Fourth Avenue. After the road outline 214 is defined, the defining module 162 may adopt the area surrounded by the road outline 214 as the block area 212.

In step S230, the querying module 163 may query a map service to find an electronic map having a map area corresponding to the block area according to contents of the printed map. In detail, the querying module 163 may recognize the road names related to the road outline 214. That is, the querying module 163 may recognize the words comprised in or nearby the road outline 214. For example, the querying module 163 may perform a character recognition on the characters on or around the road outline 214 to obtain the words of the road names. Specifically, the character recognition can be an optical character recognition (OCR) or other algorithms capable of recognizing the words of the road names, but the present application is not limited thereto. Herein, since the arrangement and orientation of the words of the road name are usually aligned to its corresponding road, the querying module 163 may perform the OCR according to the direction of the roads.

Taking the First Avenue as an example. It can be observed that the First Avenue is illustrated in an inclined way. After the road outline 214 is defined, the querying module 163 may perform the OCR according to the direction of the First Avenue to recognize the words contained in the First Avenue, i.e., "First Avenue". Similarly, after the road outline 214 is defined, the picture processing module 164 may also respectively recognize the words contained in the Second Avenue, the Third Avenue, and the Fourth Avenue, i.e., "Second Avenue", "Third Avenue," and "Fourth Avenue". Further, the querying module 163 may respectively store the recognized road names in a specific memory (not shown) for facilitating the following operations.

With the recognized road names, the querying module 163 may query a map service with the recognized road names to find an electronic map having a map area corresponded to the block area 212 in the map service. The map service may be an electronic map that may be used to search for corresponding locations after querying specific key words, for example a map service provided in the electronic apparatus 10 or provided from a map service server, for example a navigation application, Google map, Bing map or the like.

However, if the querying module 163 queries only one of the road names, the corresponding road of the picture 210 may not be able to correctly found since there may exist plenty of roads having the same name at different places. Hence, in some examples, the querying module 163 may simultaneously query the map service with all of the recognized road names. As a result, the map service may use the recognized road names to find the electronic map having the map area surrounded by roads corresponding to the recognized road names. Or, the querying module 163 may respectively query the recognized roads. When one of the recognized road names is queried, the querying module 163 may mark its corresponding road in the map service by, for example, highlighting the entire road. After all of the recognized road names are queried, the querying module 163 may further query the map service to find out whether there exists a map area surrounded by marked roads. At this time, the querying module 163 may adopt the map area surrounded by the marked roads in the map service as the map area corresponding to the block area 212 of the picture 210.

In other examples, the querying module 163 may query the map service with pairs of the recognized road names to find intersections in the map service. As mentioned before, since the map service may not be able to precisely find the correct road when querying only one road name, the querying module 163 may query two of the recognized road names at once. With the two queried road names, the querying module 163 may find an intersection constituted by the crossing of the roads corresponding to the two queried road names. Similarly, the querying module 163 may mark the intersection by, for example, labelling a flag, a pin or the like. Next, the querying module 163 may query the map service with another pair of the recognized road names and mark the corresponding intersection as well. After all of the intersections related to the recognized roads are founded, the querying module 163 may adopt the map area having the intersections as corners in the map service as the map area corresponding to the block area 212.

Figure 3C:
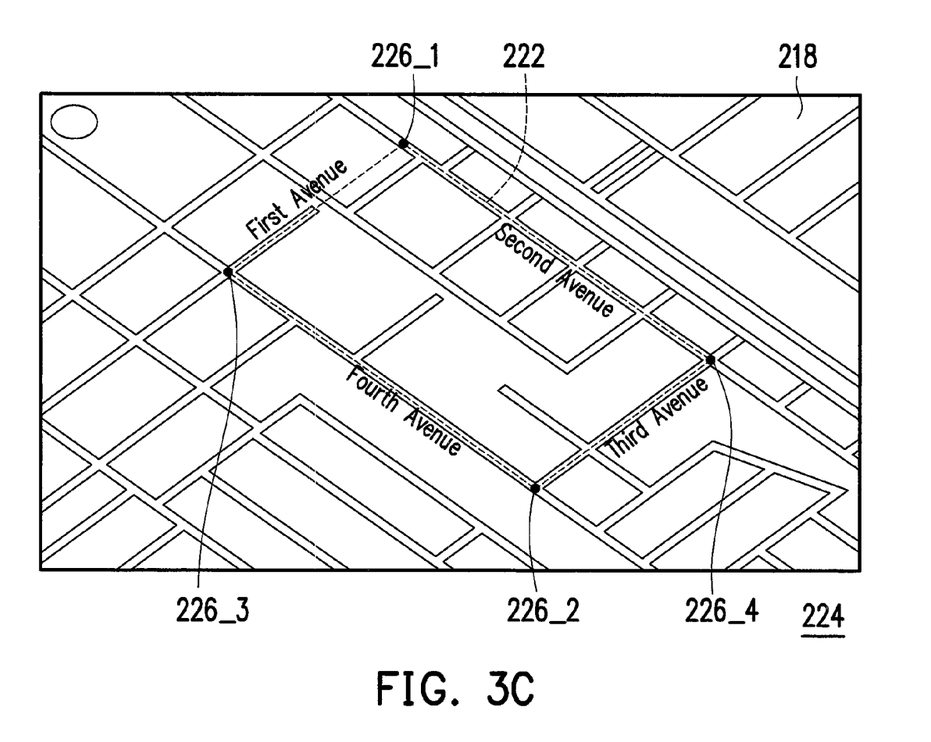
FIG. 3C is a schematic diagram illustrating a method for finding a map area corresponding to the block area by using a map service according to an example of the present application.

FIG. 3C is a schematic diagram illustrating a method for finding a map area corresponding to the block area by using a map service according to an example of the present application. Referring to both FIGS. 3B and 3C, the querying module 163 may firstly query the map service with "First Avenue" and "Second Avenue", and mark an intersection 226_1 in the electronic map 218 of the map service 224. Next, the querying module 163 may query the map service with "Third Avenue" and "Fourth Avenue", and mark an intersection 226_2 in the map service 224 as well. Afterwards, intersections 226_3 and 226_4 may also be founded with aforementioned teachings. Hence, the querying module 163 may adopt the map area 222 as the map area corresponding to the block area 212.

In another example, since a substantially rectangular block may be defined after finding its two diagonal intersections, the querying module 163 can easily find the map area 222 in the map service 224 with only two intersections. For example, the querying module 163 may firstly query a first pair of the recognized road names, e.g., "First Avenue" and "Second Avenue". Next, the querying module 163 may highlight the roads related to the founded intersection, i.e., the intersection 226_1. Afterwards, the querying module 163 may query a second pair of the recognized road names, which contains road names different from the first pair of the recognized road names, e.g., "Third Avenue" and "Fourth Avenue". Similarly, the querying module 163 may highlight the roads related to the founded intersection as well, i.e., the intersection 226_2. At this time, since the highlighted roads related to the two founded intersection (i.e., the intersections 226_1 and 226_2) would be very possible to surround a specific block, the querying module 163 may define the specific block as the map area 222, which corresponds to the block area 212.

Figure 3D:
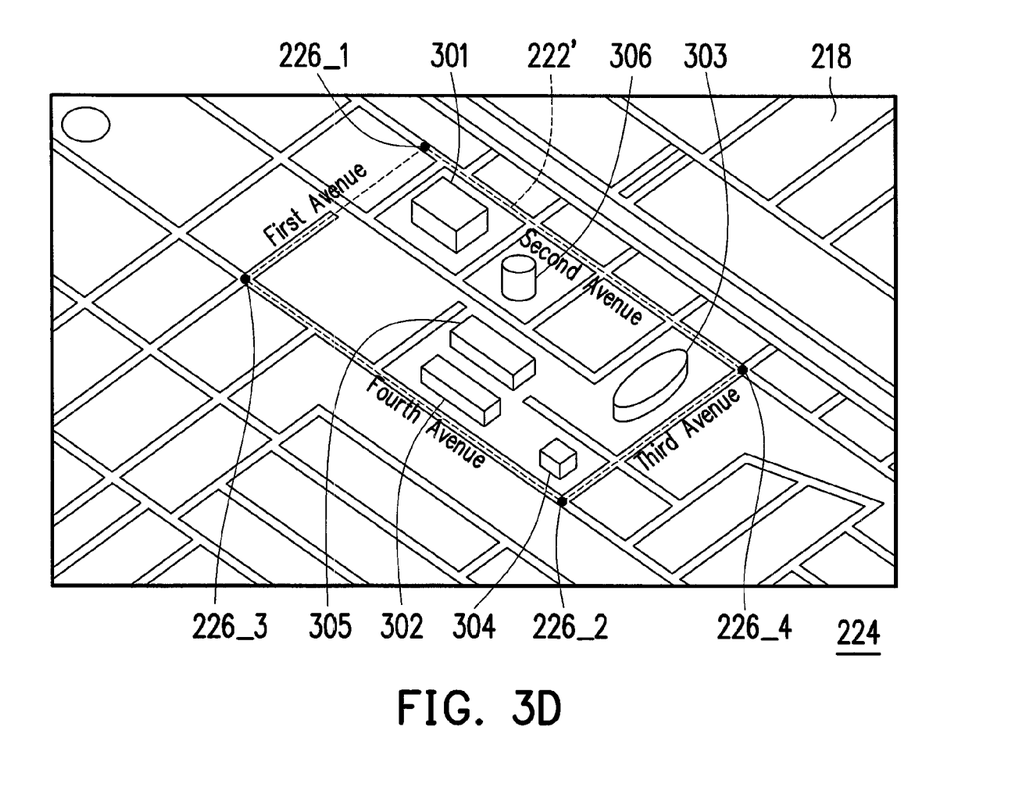
FIG. 3D is a schematic diagram illustrating the 3-D models provided by the map service according to an exemplary example of the present application.

In step S240, the retrieving module 164 retrieves a plurality of 3-D models of a plurality of buildings located in the map area 222. For example, the retrieving module 164 may request the map service to provide the 3-D models of the buildings. Referring to FIG. 3D, FIG. 3D is a schematic diagram illustrating the 3-D models provided by the map service according to an exemplary example of the present application.

In step S250, the mapping module 165 may map the 3-D models on the picture 210. In the present example, a map area 222' may be regarded as a modified version of the map area 222, where the map area 222' includes several 3-D models (e.g., 3-D models 301-306) of the buildings located in the map area 222'. The 3-D models 301-306 may respectively correspond to "School", "Hospital", "Park", "Gas Station", "Hotel" and "Bistro", but the application is not limited thereto. In detail, since the scale and the orientation of the map area 222' of FIG. 3D and the block area 212 of FIG. 3B are different from each other, the mapping module 165 may adjust the scale and the orientation of the block area 212 to fit the scale and the orientation of the map area 222' in the map service 224, or adjust the scale and the orientation of the map area 222' in the map service 224 to fit the scale and the orientation of the block area 212. For example, the mapping module 165 may firstly detect the directions and the lengths of at least one of the roads in and/or surrounding the map area 222'. Next, the mapping module 165 may analyze the directions of at least one of the roads in and/or surrounding the map area 222' to find out the orientation difference between the block area 212 and the map area 222'. Afterwards, the mapping module 165 may rotate the block areas 212 or the map area 222' according to the orientation difference.

Besides, the mapping module 165 may adjust the scale of the block areas 212 or the map area 222' according to the lengths of at least one of the roads in and/or surrounding the block area 212 and the map area 222'. For example, the mapping module 165 may adjust the length of the First Avenue in FIG. 3B to match the length of the First Avenue in FIG. 3D, i.e., the distance between the intersections 226_1 and 226_2, or adjust the length of the First Avenue in FIG. 3D to match the length of the First Avenue in FIG. 3B. Meanwhile, the mapping module 165 may also perform same operations to the Second Avenue, the Third Avenue, and the Fourth Avenue in FIG. 3B or 3D. As a result, the mapping module 165 can obtain a zoomed image of the picture 210 or the picture 210 with original size and map the same to a scaled electronic map further.

In another example, sometimes the proportional scales of different areas of the printed map 220 are different, and therefore, the mapping module 165 needs to adjust the scale of the block areas 212 with different scale ratios for different areas, respectively. For example, the mapping module 163 may adjust the scales of different areas of the block areas 212 according to the lengths of a plurality of the roads in and/or surrounding the block area 212.

After adjusting the scale and orientation of the map area 222, the mapping module 165 may paste the 3-D models on the picture 210 with the map area 222' aligning to the block area 212. Specifically, the mapping module 165 may directly copy the entire map area 222' (including the 3-D models 301-306) and paste the copied map area 222' on the picture 210. From another point of view, the mapping module 165 may overlap the block area 212 with the map area 222'. Therefore, the user 230 may observe that there are some 3-D models of the buildings "growing" from the block area 212 of the picture 210.

Figure 3E:
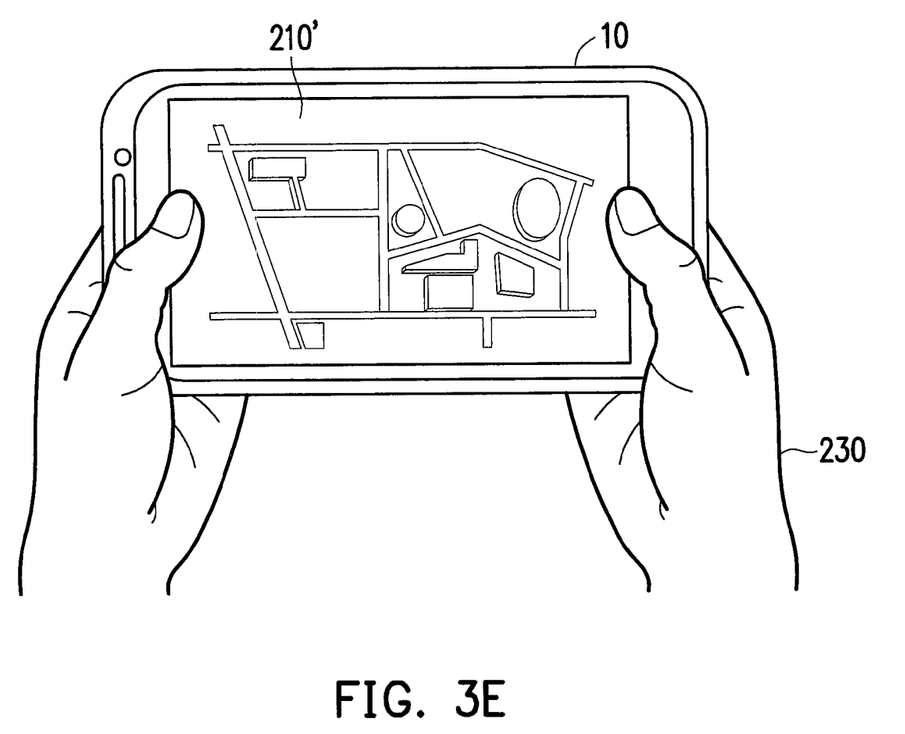
FIG. 3E is a schematic diagram illustrating the picture after being mapped according to an exemplary example of the present application.

Referring to FIG. 3E, FIG. 3E is a schematic diagram illustrating the picture after being mapped according to an exemplary example of the present application. In view of FIG. 3E, the user may see that the originally captured picture 210 has become another picture 210', which shows several 3-D models of the buildings located in the block area 212.

As a result, when the user takes a picture of the printed map, the electronic apparatus can automatically find the map area of the electronic map corresponding to the printed map, and retrieve the 3-D models of the buildings located in the map area. Next, the electronic apparatus may paste the retrieved 3-D models on the corresponding positions of the originally captured picture, such that the visual effects that the 3-D models growing from the originally captured picture may be created. That is, the user can use the default functions of the electronic map to transform the originally captured 2-D picture to be another fabulous picture with 3-D effects. Therefore, a novel, intuitive, and convenient user experience can be established by the provided examples of the present application.

In other examples, since the printed map may not be accurately illustrated, the positions of the 3-D models may not be accurately placed as well. Hence, the present application proposes some modified versions of the previously mentioned method, which can further enhance the resulted visual effects and the provided experience.

Figure 4:
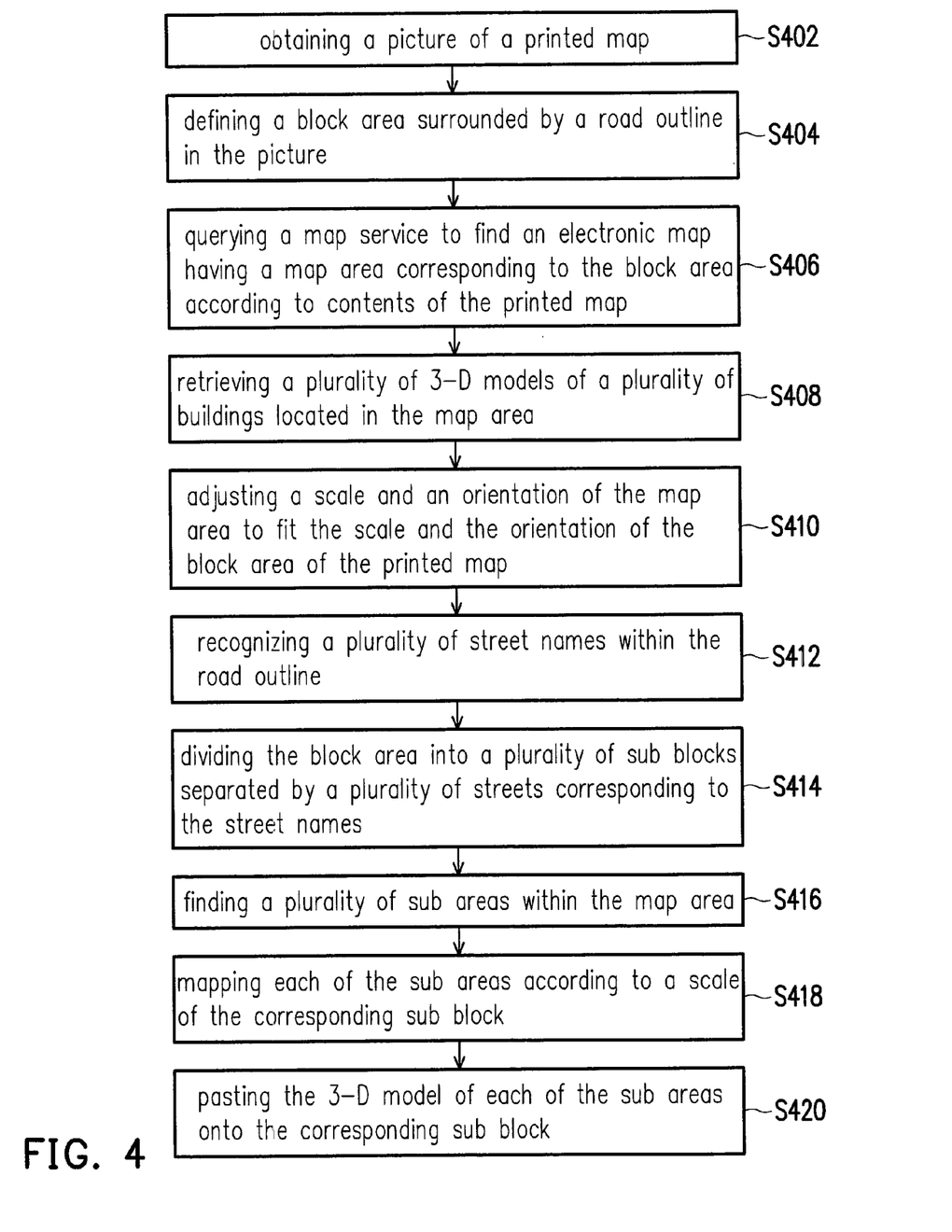
FIG. 4 is a flow chart illustrating a method for retrieving a map according to an exemplary example of the present application.

FIG. 4 is a flow chart illustrating a method for retrieving a map according to an exemplary example of the present application. In the present example, the steps illustrated in FIG. 4 may be adapted to the electronic apparatus 10 of FIG. 1, but the application is not limited thereto. Below, the method for retrieving the map is described in detail with reference to various components of the electronic apparatus 10.

In step S402, the obtaining module 161 may obtain a picture of a printed map under the operation of a user. In step S404, the defining module 162 may define a block area surrounded by a road outline in the picture. In step S406, the querying module 163 may query a map service to find an electronic map having a map area corresponding to the block area according to contents of the printed map. In step S408, the retrieving module 164 may retrieve a plurality of 3-D models of a plurality of buildings located in the map area. In step S410, the mapping module 165 may adjust the scale and the orientation of the map area in the map service to fit the scale and the orientation of the block area of the printed map. Details of steps S402-S410 may be referred to the teaching of the aforementioned examples, which would not be repeated herein.

In step S412, the mapping module 165 may recognize a plurality of street names within the road outline. In the present example, the street names are not necessary to be actually names of streets within the road outline, but may also be names of roads, avenues, lanes, alleys within the road outline, which are not limited thereto. Specifically, in the present example, other than the road names on the road outline, the streets within the road outline may also be recognized. In one example, after the road outline is determined, the mapping module 165 may determine whether there are other characters or words existed in the region surrounded by the road outline. Since the object being captured is a printed map, the words printed on the printed map are normally names of roads, streets, avenues, lanes, alleys, cities, or places, and the mapping module 165 may easily determine whether the detected words are related to a street name by recognizing the last word of the detected words. For example, if the detected words are "AA St.", "BB Ave.", "CC Rd.", the mapping module 165 would know that these words are street names since the last words are "St.", "Ave." and "Rd."

In step S414, the mapping module 165 may divide the block area into a plurality of sub blocks separated by a plurality of streets corresponding to the street names. Specifically, the mapping module 165 may highlight the streets related to the recognized street names, and subsequently define the regions separated by the highlighted streets as the sub blocks.

In step S416, the mapping module 165 may find a plurality of sub areas within the map area, where the sub areas correspond to the sub blocks. Specifically, the mapping module 165 may adopt the recognized street names to query the map service to find the actual streets located in the map area. Next, the mapping module 165 may also highlight the actual streets, and define the regions separated by the highlighted actual streets as the sub areas.

In step S418, the mapping module 165 may map each of the sub areas to the corresponding sub block according to a scale of the corresponding sub block. In detail, since the sub blocks of the printed map may be roughly illustrated, the 3-D models may not be properly placed if the scales of the sub areas and the sub blocks do not match. Therefore, the mapping module 165 may adjust the shapes or outlines of the sub areas to match their corresponding sub blocks, such that the 3-D models of the buildings can be placed on correct sub blocks instead of the streets within the road outline.

With the adjusted sub areas, in step S420, the mapping module 165 may paste the 3-D model of each of the sub areas onto the corresponding sub block. Specifically, the mapping module 165 may paste the 3-D models of the building of the sub areas onto the corresponding sub blocks.

Specifically, the 3-D models of the building of the sub areas could be pasted onto the corresponding sub blocks in an augmented reality way. That is, the mapping module 165 can real-timely adjust the sizes and orientations of the 3-D models of the building of the sub areas according to the relative positions, angles and distances between the printed map 220 and the electronic apparatus 10. Hence, the 3-D models of the buildings of the sub areas can be properly resized, rotated and placed onto the printed map 220 displayed on the preview window of the electronic apparatus 10, so as to provide users with realistic feeling as if they watch those buildings from the angle they take the picture of the printed map 220.

As a result, the 3-D models of the buildings may be accurately placed on the correct sub block, even though the sub blocks retrieved from the printed map may be roughly illustrated. Hence, the user experience provided by the present application may be further improved.

Except for defining the sub blocks according to the recognized street names, in other examples, another modified version of the previously mentioned method is further introduced, which may also be applied to enhance the resulted visual effects and the provided experience.

Figure 5:
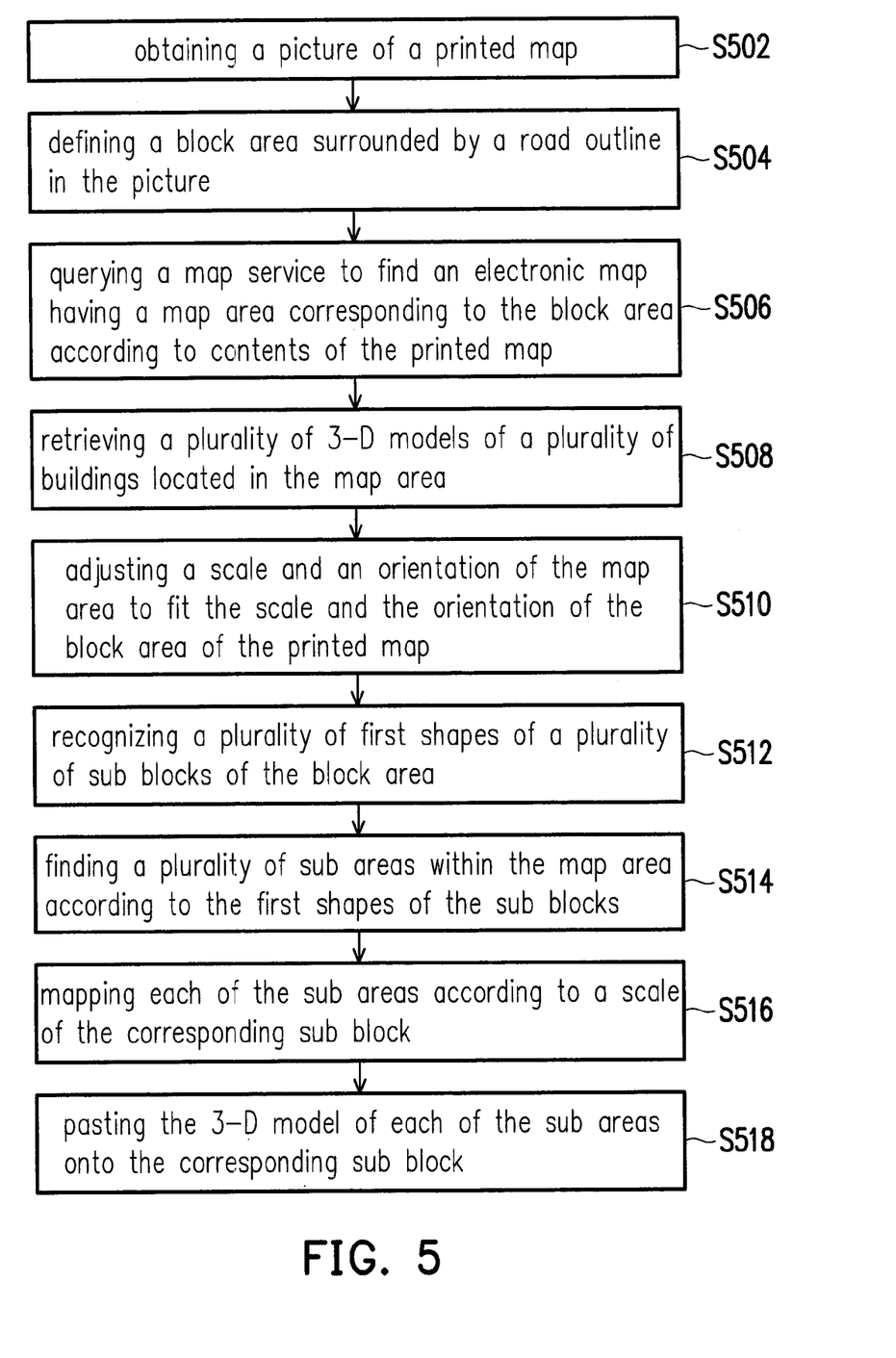
FIG. 5 is a flow chart illustrating a method for retrieving a map according to an exemplary example of the present application.

FIG. 5 is a flow chart illustrating a method for retrieving a map according to an exemplary example of the present application. In the present example, the steps illustrated in FIG. 5 may be adapted to the electronic apparatus 10 of FIG. 1, but the application is not limited thereto. Below, the method for retrieving the map is described in detail with reference to various components of the electronic apparatus 10.

In step S502, the obtaining module 161 may obtain a picture of a printed map under the operation of a user. In step S504, the defining module 162 may define a block area surrounded by a road outline in the picture. In step S506, the querying module 163 may query a map service to find an electronic map having a map area corresponding to the block area according to contents of the printed map. In step S508, the retrieving module 164 may retrieve a plurality of 3-D models of a plurality of buildings located in the map area. In step S510, the mapping module 165 may adjust the scale and the orientation of the map area in the map service to fit the scale and the orientation of the block area of the printed map. Details of steps S502-S510 may be referred to the teaching of the aforementioned examples, which would not be repeated herein.

In step S512, the mapping module 165 may recognize a plurality of first shapes of a plurality of sub blocks of the block area. In some examples, the mapping module 165 may perform the image processing method on the block area to recognize the first shapes of the sub blocks, but the application is not limited thereto.

In step S514, the mapping module 165 may find a plurality of sub areas within the map area according to the first shapes of the sub blocks. As mentioned before, the sub areas may be separated by the actual streets located in the map area. Under this situation, the mapping module 165 may respectively compare the first shapes with a plurality of second shapes of the found sub areas. When the mapping module 165 determines that the similarity between the considered first shape and second shape is over a predetermined threshold (e.g., 80%), the mapping module 165 may subsequently determine that the sub block and the sub area, which respectively relate to the considered first shape and second shape, correspond to each other.

In step S516, the mapping module 165 may map each of the sub areas according to a scale of the corresponding sub block. In step S518, the mapping module 165 may paste the 3-D model of each of the sub areas onto the corresponding sub block. Specifically, the mapping module 165 may paste the 3-D models of the building of the sub areas onto the corresponding sub blocks. Details of step S516 and S518 may be referred to step S418 and S420, which would not be repeated herein.

With the method proposed in FIG. 5, the 3-D models of the buildings may be accurately placed on the correct sub block, even though the sub blocks retrieved from the printed map may be roughly illustrated. Hence, the user experience provided by the present application may be further improved.

Figure 6A:
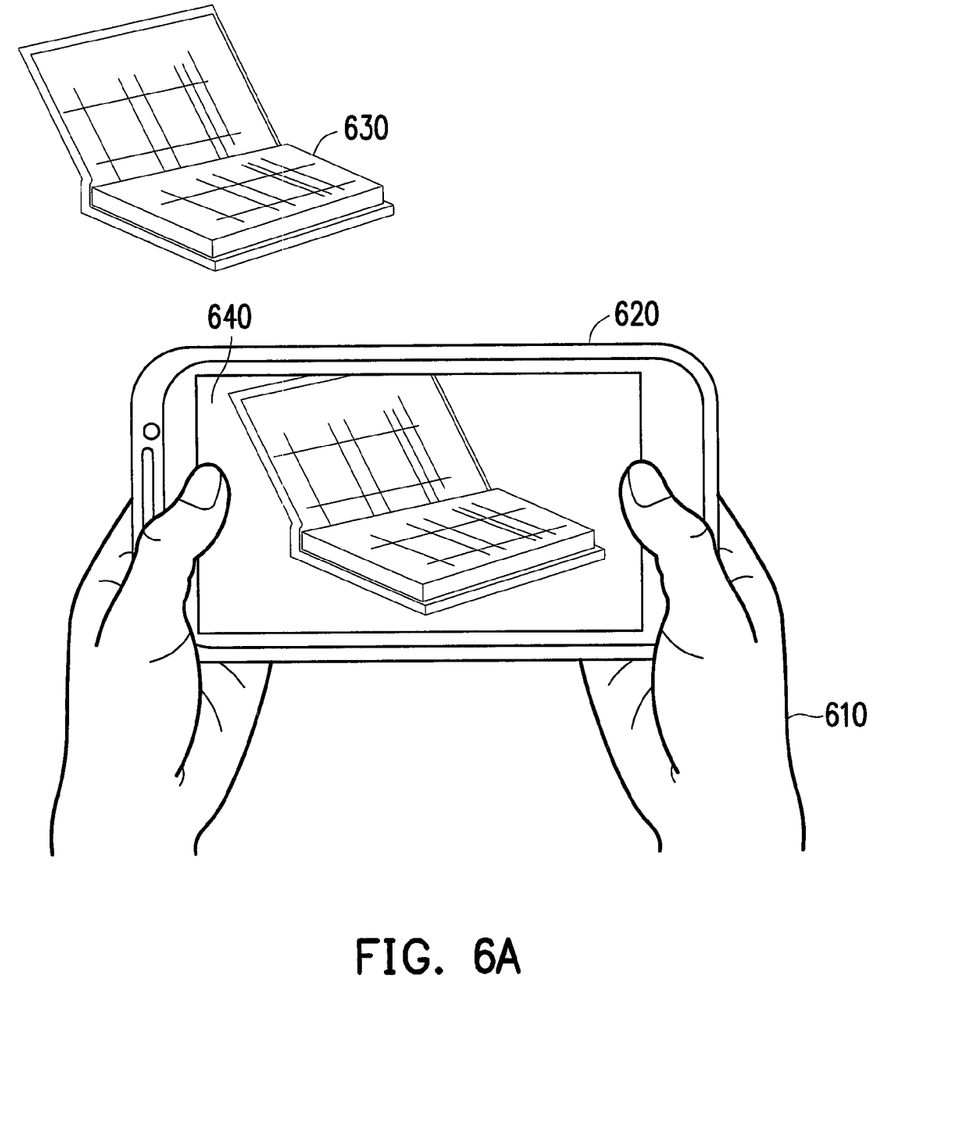
FIG. 6A to FIG. 6B are schematic diagrams illustrating a demonstration of the proposed method according to an exemplary example of the present application
Figure 6B:
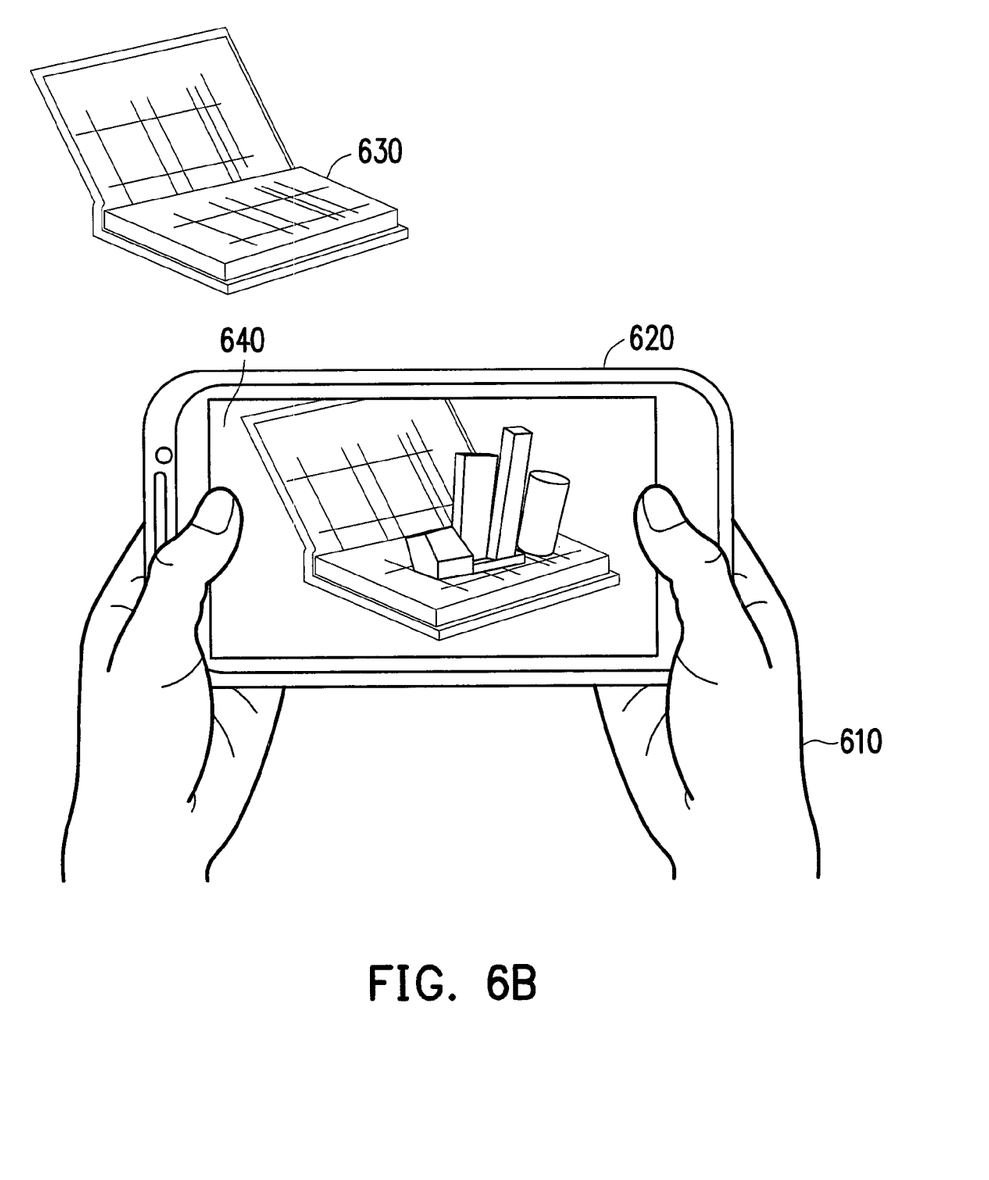

FIG. 6A to FIG. 6B are schematic diagrams illustrating a demonstration of the proposed method according to an exemplary example of the present application. In the present example, a user 610 may use an electronic apparatus 620 to capture a printed map 630, and the electronic apparatus 620 may correspondingly show a picture 640 of the printed map 630. With the picture 630, the electronic apparatus 620 may subsequently perform the method proposed in the present application, and the resulted visual effects provided by the present application may be referred to FIG. 6B, through which a novel and fabulous way to retrieve a map is obtained.

The application provides a computer-readable medium, which records a computer program to be loaded into an electronic apparatus to execute the steps of the aforementioned method for retrieving a map. The computer program is composed of a plurality of program instructions (for example, an organization chart establishing program instruction, a table approving program instruction, a setting program instruction, and a deployment program instruction, etc), and these program instructions are loaded into the electronic apparatus and executed by the same to accomplish various steps of the method for retrieving a map.

To sum up, the examples of the present invention provide a method, an electronic apparatus, and a computer readable medium for retrieving a map. With the proposed method, when the user takes a picture of the printed map, the electronic apparatus can automatically find the map area of the electronic map corresponding to the printed map, and retrieve the 3-D models of the buildings located in the map area. Next, the electronic apparatus may paste the retrieved 3-D models on the corresponding positions of the originally captured picture, such that the visual effects that the 3-D models growing from the picture may be created. Therefore, a novel, intuitive, and convenient user experience may be established by the provided examples of the present application.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for retrieving a map, adapted to a portable electronic apparatus comprising a smart phone, a personal digital assistant (PDA), or a tablet, comprising:
   obtaining a picture of a printed map from photo taken by a camera, a photo gallery stored in a memory of the portable electronic apparatus, a cloud server, or a web page by a processing unit of the portable electronic apparatus;
   defining a block area surrounded by a road outline in the picture by the processing unit;
   querying a map service provided in the portable electronic apparatus or provided from a map service server to find an electronic map having a map area corresponding to the block area according to contents of the printed map by the processing unit;
   retrieving a plurality of 3-D models of a plurality of buildings located in the map area from the map service by the processing unit; and
   mapping the 3-D models on the picture by the processing unit, comprising:
      adjusting a scale and an orientation of the map area to fit the scale and the orientation of the block area of the printed map;
      recognizing a plurality of street names within the road outline;
      dividing the block area into a plurality of sub blocks separated by a plurality of streets corresponding to the street names;
      finding a plurality of sub areas within the map area, wherein the sub areas correspond to the sub blocks;
      mapping each of the sub areas to the corresponding sub block according to a scale of the sub area and a scale of the corresponding sub block; and
      pasting the 3-D models on the picture with the map area aligning to the block area after mapping each of the sub areas to the corresponding sub block.

2. The method as claimed in claim 1, wherein the step of defining the block area surrounded by the road outline in the picture comprises:
   performing an image processing method on the picture to detect the road outline; and
   adopting a picture area surrounded by the road outline as the block area.

3. The method as claimed in claim 1, wherein the step of querying the map service to find the electronic map having the map area corresponding to the block area according to the contents of the printed map comprising:
   recognizing at least one road name related to the road outline;
   querying the map service with the at least one recognized road name to find the electronic map having the map area surrounded by at least one road corresponding to the at least one recognized road name in the map service.

4. The method as claimed in claim 3, wherein the step of recognizing the at least one road name related to the road outline comprises:
   performing a character recognition on at least one character around the road outline to obtain the at least one road name.

5. The method as claimed in claim 1, wherein the step of querying the map service to find the electronic map having the map area corresponding to the block area according to the contents of the printed map comprises:
- recognizing at least one road name related to the road outline;
- querying the map service with pairs of the at least one recognized road name to find a plurality of intersections in the map service; and
- adopting the map area having the intersections as corners in the map service as the map area corresponding to the block area.

6. The method as claimed in claim 1, wherein the step of pasting the 3-D models on the picture with the map area aligning to the block area comprises:
- pasting the 3-D model of each of the sub areas onto the corresponding sub block.

7. A non-transitory computer-readable medium, recording program instructions for performing the method as claimed in claim 1.

8. A portable electronic apparatus comprising a smart phone, a personal digital assistant (PDA), or a tablet for retrieving a map, comprising:
- an input unit, receiving data;
- an output unit, presenting the data; and
- a memory, storing information comprising program routines, comprising:
  - an obtaining module, obtaining a picture of a printed map from photo taken by a camera, a photo gallery stored in a memory of the portable electronic apparatus, a cloud server, or a web page;
  - a defining module, defining a block area surrounded by a road outline in the picture;
  - a querying module, querying a map service provided in the portable electronic apparatus or provided from a map service server to find an electronic map having a map area corresponding to the block area according to contents of the printed map;
  - a retrieving module, retrieving a plurality of 3-D models of a plurality of buildings located in the map area from the map service;
  - a mapping module, mapping the 3-D models on the picture; and
- a processing unit coupled to the input unit, the output unit and the memory for controlling the execution of the program routines, wherein the mapping module further:
- adjusts a scale and an orientation of the map area to fit the scale and the orientation of the block area of the printed map;
- recognizes a plurality of street names within the road outline;
- divides the block area into a plurality of sub blocks separated by a plurality of streets corresponding to the street names;
- finds a plurality of sub areas within the map area, wherein the sub areas correspond to the sub blocks;
- maps each of the sub areas to the corresponding sub block according to a scale of the sub area and a scale of the corresponding sub block; and
- pastes the 3-D models on the picture with the map area aligning to the block area after mapping each of the sub areas to the corresponding sub block.

9. The portable electronic apparatus as claimed in claim 8, wherein the defining module performs an image processing method on the picture to detect the road outline, and adopts a picture area surrounded by the road outline as the block area.

10. The portable electronic apparatus as claimed in claim 8, wherein the querying module recognizes at least one road name related to the road outline, queries the map service with the at least one recognized road name to find the electronic map having the map area surrounded by at least one road corresponding to the at least one recognized road name in the map service.

11. The portable electronic apparatus as claimed in claim 8, wherein the querying module performs a character recognition on at least one character around the road outline to obtain the at least one road name.

12. The portable electronic apparatus as claimed in claim 8, wherein the querying module recognizes at least one road name related to the road outline, queries the map service with pairs of the at least one recognized road name to find a plurality of intersections in the map service, and adopts the map area having the intersections as corners in the map service as the map area corresponding to the block area.

13. The portable electronic apparatus as claimed in claim 8, wherein the mapping module pastes the 3-D model of each of the sub areas onto the corresponding sub block.

14. A method for retrieving a map, adapted to a portable electronic apparatus comprising a smart phone, a personal digital assistant (PDA), or a tablet, comprising:
- obtaining a picture of a printed map from photo taken by a camera, a photo gallery stored in a memory of the portable electronic apparatus, a cloud server, or a web page by a processing unit of the portable electronic apparatus;
- defining a block area surrounded by a road outline in the picture by the processing unit;
- querying a map service provided in the portable electronic apparatus or provided from a map service server to find an electronic map having a map area corresponding to the block area according to contents of the printed map by the processing unit;
- retrieving a plurality of 3-D models of a plurality of buildings located in the map area from the map service by the processing unit; and
- mapping the 3-D models on the picture by the processing unit, comprising:
  - adjusting a scale and an orientation of the map area to fit the scale and the orientation of the block area of the printed map;
  - recognizing a plurality of shapes of a plurality of sub blocks in the block area, wherein the sub blocks are separated by a plurality of streets;
  - finding a plurality of sub areas within the map area according to the first shapes of the sub blocks;
  - mapping each of the sub areas to the corresponding sub block according to a scale of the sub area and a scale of the corresponding sub block; and
  - pasting the 3-D models on the picture with the map area aligning to the block area after mapping each of the sub areas to the corresponding sub block.

15. The method as claimed in claim 14, wherein the step of pasting the 3-D models on the picture with the map area aligning to the block area comprises:
- pasting the 3-D model of each of the sub areas onto the corresponding sub block.

16. A portable electronic apparatus comprising a smart phone, a personal digital assistant (PDA), or a tablet for retrieving a map, comprising:
- an input unit, receiving data;
- an output unit, presenting the data; and
- a memory, storing information comprising program routines, comprising:

an obtaining module, obtaining a picture of a printed map from photo taken by a camera, a photo gallery stored in a memory of the portable electronic apparatus, a cloud server, or a web page;

a defining module, defining a block area surrounded by a road outline in the picture;

a querying module, querying a map service provided in the portable electronic apparatus or provided from a map service server to find an electronic map having a map area corresponding to the block area according to contents of the printed map;

a retrieving module, retrieving a plurality of 3-D models of a plurality of buildings located in the map area from the map service;

a mapping module, mapping the 3-D models on the picture; and a processing unit coupled to the input unit, the output unit and the memory for controlling the execution of the program routines, wherein the mapping module further:

adjusts a scale and an orientation of the map area to fit the scale and the orientation of the block area of the printed map;

recognizes a plurality of shapes of a plurality of sub blocks in the block area, wherein the sub blocks are separated by a plurality of streets;

finds a plurality of sub areas within the map area according to the first shapes of the sub blocks;

maps each of the sub areas to the corresponding sub block according to a scale of the sub area and a scale of the corresponding sub block; and pastes the 3-D models on the picture with the map area aligning to the block area after mapping each of the sub areas to the corresponding sub block.

17. The portable electronic apparatus as claimed in claim 16, wherein the mapping module pastes the 3-D model of each of the sub areas onto the corresponding sub block.

\* \* \* \* \*